United States Patent
Yoon et al.

(10) Patent No.: US 9,391,329 B2
(45) Date of Patent: Jul. 12, 2016

(54) NEGATIVE ELECTRODE FOR LITHIUM BATTERY, LITHIUM BATTERY INCLUDING THE SAME, AND METHODS OF MANUFACTURE THEREOF

(71) Applicants: Samsung Electronics Co., Ltd., Suwon-si, Gyeonggi-do (KR); Industry-University Cooperation Foundation Hanyang University, Seoul (KR)

(72) Inventors: Seon-mi Yoon, Yongin-si (KR); Jae-young Choi, Suwon-si (KR); Han-su Kim, Seoul (KR); Ho-bum Park, Seoul (KR); Moon-seok Kwon, Hwaseong-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 169 days.

(21) Appl. No.: 13/893,597

(22) Filed: May 14, 2013

(65) Prior Publication Data
US 2013/0309571 A1    Nov. 21, 2013

(30) Foreign Application Priority Data

May 16, 2012    (KR) ........................ 10-2012-0052204

(51) Int. Cl.
*H01M 4/583*    (2010.01)
*H01M 4/40*    (2006.01)
*H01M 4/134*    (2010.01)
*H01M 4/36*    (2006.01)
*H01M 10/052*    (2010.01)
*H01M 4/04*    (2006.01)
(Continued)

(52) U.S. Cl.
CPC ............ *H01M 4/583* (2013.01); *H01M 4/0404* (2013.01); *H01M 4/0428* (2013.01); *H01M 4/133* (2013.01); *H01M 4/134* (2013.01); *H01M 4/366* (2013.01); *H01M 4/405* (2013.01); *H01M 4/587* (2013.01); *H01M 10/052* (2013.01); *H01M 4/382* (2013.01); *H01M 2004/027* (2013.01); *Y02E 60/122* (2013.01); *Y02T 10/7011* (2013.01)

(58) Field of Classification Search
CPC .............................. H01M 4/382; H01M 4/405
See application file for complete search history.

(56) References Cited

U.S. PATENT DOCUMENTS 5,387,479 A * 2/1995 Koksbang ............... H01M 4/13
427/122
6,150,055 A    11/2000 Kato et al.
(Continued)

FOREIGN PATENT DOCUMENTS

JP    11-135116 A    5/1999
JP    11135116    5/1999
(Continued)

OTHER PUBLICATIONS

X-Ray Study of the Graphitization of Carbon Black, B. E. Warren, Massachusetts Institute of Technology, Cambridge, Massachusetts.*
(Continued)

*Primary Examiner* — Scott J Chmielecki
(74) *Attorney, Agent, or Firm* — Cantor Colburn LLP (57) ABSTRACT

A negative electrode including: a metal layer including lithium; and a platy carbonaceous material layer including a carbonaceous material having a plate structure and disposed on the metal layer.

15 Claims, 6 Drawing Sheets (51) Int. Cl.
   *H01M 4/133* (2010.01)
   *H01M 4/587* (2010.01)
   *H01M 4/38* (2006.01)
   *H01M 4/02* (2006.01)

(56) References Cited

U.S. PATENT DOCUMENTS

| | | | | |
|---|---|---|---|---|
| 2003/0129497 | A1* | 7/2003 | Yamamoto | H01M 4/131 429/246 |
| 2005/0095504 | A1 | 5/2005 | Kim et al. | |
| 2006/0068291 | A1* | 3/2006 | Herzel | H01M 4/133 429/231.4 |
| 2007/0122710 | A1 | 5/2007 | Kwon et al. | |
| 2009/0104520 | A1* | 4/2009 | Marple | H01M 2/022 429/164 |
| 2010/0176337 | A1 | 7/2010 | Zhamu et al. | |
| 2010/0206363 | A1* | 8/2010 | Choi | B82Y 30/00 136/252 |
| 2011/0033677 | A1 | 2/2011 | Shin et al. | |
| 2011/0294013 | A1* | 12/2011 | Bosnyak | B82Y 30/00 429/231.1 |

FOREIGN PATENT DOCUMENTS

| | | |
|---|---|---|
| JP | 2001-229927 A | 8/2001 |
| JP | 2008-536254 A | 9/2008 |
| JP | 2009-140648 A | 6/2009 |
| JP | 2009-151956 A | 7/2009 |
| JP | 2010-049928 A | 3/2010 |
| KR | 1020100088667 A | 8/2010 |
| KR | 101037766 B1 | 5/2011 |

OTHER PUBLICATIONS

The International Search Report and the Written Opinion for International Application No. PCT/KR2013/004289 dated Aug. 12, 2013.
Brodie, B.C. Sur le poids atomique graphite. Ann Chim Phys 1860, 59, 466-72.
Hummers W and Offeman R., "Preparation of graphite oxide". J Am Chem Soc, Mar. 20, 1958, 80, pp. 1339.
Staudenmaier L. Verfahren zurdarstellung der graphitsaure, Ber Dtsch Chem Ges 1898, 31, 1481-99.
Kim et al., "Recent Developments in Anode Materials for Lin Secondary Batteries", Journal of the Korean Electrochemical Society, vol. 11, No. 3, 2008, pp. 211-222.
Lian et al., "Large Reversible capacity of high quality graphene sheets as an anode material for lithium-ion batteries", Electrochimica Acta, vol. 55, 2010, pp. 3909-3914.
Liang et al., "Superior cycle performance of Sn@C/graphene nanocomposite as an anode material for lithium-ion batteries", Journal of Solid State Chemistry, vol. 184, 2011, pp. 1400-1404.
Shi et al., "Nanosized $Li_4Ti_5O_{12}$/graphene hybrid materials with low polarization for high rate lithium ion batteries", Journal of Power Sources, vol. 196, 2011, pp. 8610-8617.
Xiang et al., "Sol-gel synthesis and electrochemical performance of $Li_4Ti_5O_{12}$/graphene composite anode for lithium-ion batteries", Journal of Alloys and Compounds, vol. 509, 2011, pp. 7205-7209.
Extended European Search Report for application 13790398.5 issued by the European Patent Office dated Jan. 19, 2016.

* cited by examiner

NEGATIVE ELECTRODE FOR LITHIUM BATTERY, LITHIUM BATTERY INCLUDING THE SAME, AND METHODS OF MANUFACTURE THEREOF

This application claims priority to and the benefit of Korean Patent Application No. 10-2012-0052204, filed on May 16, 2012, and all the benefits accruing therefrom under 35 U.S.C. §119, the content of which is incorporated herein in its entirety by reference.

BACKGROUND

1. Field

The present disclosure relates to a negative electrode for a lithium battery, a lithium battery including the same, and methods of manufacture thereof. The negative electrode provides improved stability and improved charging and discharging characteristics.

2. Description of the Related Art

Lithium batteries are used in portable electronic devices for mobile communication, such as personal digital assistants (PDAs), mobile phones, notebook computers, electric bicycles, or electric vehicles, and have a discharge voltage more than twice that of aqueous batteries, and thus, have high energy density.

Lithium-ion batteries, which include a carbonaceous (e.g., graphitic) negative electrode material, produce electrical energy from oxidation and reduction reactions which occur when lithium ions are intercalated into or deintercalated from a positive electrode and a negative electrode, each of which includes an active material that can intercalate and deintercalate the lithium ions.

A negative electrode including lithium metal or a lithium alloy as a negative electrode material can have 10 times greater specific capacity than graphite, and due to such a high capacity, much research into lithium metal and lithium alloys has been conducted. However, when lithium metal or a lithium alloy are used in a negative electrode, a solid electrolyte interface (SEI, i.e., a solid electrolyte interphase) is formed due to a chemical reaction between an electrolyte and lithium metal or the lithium alloy during charging, and many lithium dendrites are formed, thereby reducing charging and discharging efficiency and potentially causing shorting to a positive electrode.

Accordingly, there remains a need to develop a negative electrode with improved stability and improved charging and discharging characteristics, and a lithium battery including the negative electrode.

SUMMARY

Provided is a negative electrode for lithium batteries having reduced volumetric change during charging and discharging.

Provided is a lithium battery with improved stability and charging and discharging characteristics.

Additional aspects will be set forth in part in the description which follows and, in part, will be apparent from the description.

According to an aspect, a negative electrode includes a metal layer including lithium; and a platy carbonaceous material layer including a carbonaceous material having a plate structure and disposed on the metal layer.

The carbonaceous material layer may have a crystalline structure.

The carbonaceous material layer may have a single-layered structure or a multi-layered structure.

The carbonaceous material layer may be formed by an exfoliation process or by a growth process.

The carbonaceous material layer may have a thin film structure.

The carbonaceous material layer may have a thickness of about 1 nanometer (nm) to 10 micrometer (μm).

The carbonaceous material layer may have a thickness of about 1 nm to about 100 nm.

The carbonaceous material layer may have a specific surface area of about 25 square meters per gram ($m^2/g$) to about 500 $m^2/g$.

An amount of the carbonaceous material layer may be in a range of about 0.03 grams (g) to about 4 g, based on 1 square centimeter ($cm^2$) of the metal layer.

The carbonaceous material layer may further include a binder.

The binder may include at least one selected from a vinylidene fluoride/hexafluoropropylene copolymer, polyvinylidenefluoride, polyacrylonitrile, polymethylmethacrylate, polytetrafluoroethylene, polyimide, polyamide imide, polyacrylic acid, polyvinyl alcohol, a styrene butadiene rubber-based polymer, acrylonitrile-butadiene rubber, acrylonitrile-butadiene-styrene rubber, acrylate-based rubber, hydroxypropylmethylcellulose, and a sodium carboxymethylcellulose ("CMC").

The metal layer including lithium may be a layer including lithium metal or a layer including a lithium-alloyable metal.

The carbonaceous material layer may be a protective layer for preventing deterioration of the metal layer.

According to another aspect, disclosed is a lithium battery including: a positive electrode; an electrolyte; and a negative electrode, wherein the negative electrode includes a metal layer including lithium, and a platy carbonaceous material layer including a carbonaceous material having a plate structure and disposed on the metal layer.

The carbonaceous material layer may have a single-layered structure or a multi-layered structure.

A separator may be interposed between the positive electrode and the negative electrode.

The carbonaceous material layer may be disposed on a surface of the negative electrode which faces the separator.

The electrolyte may be an aqueous electrolyte or a non-aqueous electrolyte.

The lithium battery may include a primary lithium battery or a secondary lithium battery.

The lithium battery may be a lithium sulfur battery.

The lithium battery may be a lithium air battery.

The platy carbonaceous material layer may be a protective layer for preventing deterioration of the metal layer.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects, features, and advantages of the present description.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. Expressions such as "at least one of," when preceding a list of elements, modify the entire list of elements and do not modify the individual elements of the list. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The term "graphene" as used in the present specification means a polycyclic aromatic molecule formed from a plurality of carbon atoms which are covalently bound to each other. The covalently bound carbon atoms may form a six-membered ring as a repeating unit, and may further include at least one of a five-membered ring and a seven-membered ring. Accordingly, graphene comprises a single layer of covalently bonded carbon atoms having $sp^2$ hybridization. A plurality of graphene layers is often referred to in the art as graphite. However, for convenience, "graphene" as used herein may be a single layer, or also may comprise a plurality of layers of carbon. Thus graphene, as used herein, may have a multiply layered structure formed by stacking single layers of graphene. In an embodiment, graphene comprises 1 to about 300 layers of carbon.

"Planar" means a shape which is substantially flat and having a uniform thickness.

"Platy" means composed of thin plate-like pieces.

Hereinafter, an embodiment of a negative electrode for a lithium battery, and an embodiment of a lithium battery including the same, are described in further detail. These embodiments are presented for illustrative purposes only. The present invention shall not be limited thereto, and is defined only by the scope of the claims.

An embodiment of the negative electrode for a lithium battery includes a metal layer including lithium, and a platy carbonaceous material layer comprising a carbonaceous material having a plate structure and disposed on, e.g., formed on, the metal layer. As is further disclosed below, the platy structure of the carbonaceous material layer comprises thin plate-like pieces of the carbonaceous material. In an embodiment, the carbonaceous material layer has a shape which corresponds to a shape of the metal layer. Also, the carbonaceous material layer may have a shape which is congruent with a shape of the metal layer.

The carbonaceous material layer is disposed on, e.g., attached to, the metal layer including lithium and may be in the form of a flat film. While not wanting to be bound by theory, it is understood that the flat film structure results in excellent adhesive strength of the carbonaceous material layer to the metal layer, so that even when an additional support is not used, the carbonaceous material layer has excellent adhesive strength with respect to the metal layer including lithium. The flat film structure may be on a microscopic and/or a macroscopic scale. In an embodiment, the carbonaceous material layer may have the flat film structure on a microscopic scale, and the negative electrode comprising the carbonaceous material layer can be rolled, e.g., to form a jelly-roll or spiral, while retaining the flat film structure on a microscopic scale. Thus the carbonaceous material layer may have a curvilinear cross-section on a macroscopic scale and a substantially linear cross-section on a microscopic scale. Also, the carbonaceous material layer is understood to suppress a side reaction between an electrolyte and the metal layer including lithium. Moreover, the carbonaceous material layer is understood to improve a current density distribution on a surface of the metal layer including lithium. It is further understood that the improved current density distribution is effective to suppress the growth of lithium dendrites.

The carbonaceous material layer may have a crystalline structure. An example of a carbonaceous material having a crystalline structure is graphite. The carbonaceous material having the crystalline structure may provide improved voltage flatness compared to coke or amorphous carbon, e.g., a lower average voltage versus lithium than coke or amorphous carbon. In an embodiment, the carbonaceous material of the carbonaceous material layer is in epitaxy with the metal layer.

The carbonaceous material layer may include graphene, which is a polycyclic aromatic molecule formed by covalently bonding a plurality of carbon atoms. The carbon atoms may be connected to each other by a covalent bond to form a 6-membered planar ring. in an embodiment, the carbon atoms may also form a 5-membered ring and/or a 7-membered ring.

The carbonaceous material layer may include at least one selected from graphene, graphene oxide ("GO"), reduced graphene oxide ("rGO"), a nano-scale graphene platelet ("NGP"), and functionalized graphene.

The term 'graphene oxide' used herein refers to graphene that has an epoxy group and/or a hydroxyl group on its surface, and at least one selected from a carboxyl group, a lactone group, a phenol group, a lactol group, a pyrone group, and a ketone group on an edge thereof. The term 'reduced graphene oxide' refers to graphene that is prepared by reducing graphene oxide, e.g., by a physiochemical method or by a high-temperature thermal treatment. Also, the term 'nano-scale graphene platelet ("NGP")' refers to plate shaped graphene that has a nano-scale length, width, and thickness, at least one of which is 1 nanometer (nm) to about 100 nm, specifically 2 to 80 nm. The term 'functionalized graphene ("FG")' refers to graphene that has at least one selected from a nitrogen functional group, a phosphorous functional group, a sulfur functional group, a hydrocarbon functional group, and a halogen functional group connected to a carbon atom.

While not wanting to be bound by theory, it is understood that the carbon atoms of the carbonaceous material layer may each have four peripheral electrons, wherein three peripheral electrons thereof completely or partially form $sp^2$ hybrid orbitals, thereby forming a σ bond, which is a strong covalent bond, and the remaining one peripheral electron forms a π bond with an adjacent carbon atom, thereby forming a hexagonal honeycomb-shaped lattice structure. A carbonaceous material layer having the $sp^2$ hybridization as described above is understood to have a strong resistance to chemical attack, so that a reaction with an electrolyte may be physically and/or chemically blocked, and a volumetric change of the negative electrode during charging and discharging may be reduced.

The carbonaceous material layer may have a single-layered structure or a multi-layered structure. The carbonaceous material layer having the single-layered structure or multi-layered structure may be formed to have a flat film, e.g., planar plate-shaped, structure on the metal layer including lithium. While not wanting to be bound by theory, it is understood that the flat film planarizes a potential distribution on the surface of a lithium metal electrode, and suppresses the growth of lithium dendrites, thereby substantially or effectively preventing deterioration of the metal layer including lithium. In an embodiment the carbonaceous material layer comprises graphene. In another embodiment the carbonaceous material layer consists of graphene.

The carbonaceous material layer may be formed by an exfoliation process or a growth process.

The carbonaceous material layer may have a single layer structure formed by liquid-phase exfoliation (also referred to as sonication of graphite), or chemical exfoliation.

A carbonaceous material layer having a single layer structure formed by liquid-phase exfoliation (i.e., sonication of graphite) may be formed by, for example, dispersing graphite in an organic solvent, followed by sonication. In this regard, graphite that is not exfoliated may be separated by centrifugation. As the organic solvent, a solvent that has suitable affinity for graphite may be used. Examples of such a solvent include at least one selected from 1-propanol, ethylene glycol, dimethylphthalate ("DMP"), N-methylpyrrolidone ("NMP"), tetrahydrofuran ("THF"), 1,2-dichlorobenzene ("ODCB"), dichloroethene ("DCE"), and dimethylacetamide. The graphite may comprise, for example, at least one selected from natural graphite, expandable graphite, or intercalated graphite.

Also, a graphene oxide having a single layer structure may also be formed by chemical exfoliation. The graphene oxide having a single layer structure may be formed by a Brodie method (e.g., as provided in Brodie, B.C., Sur le poids atomique graphite, Ann. Chim. Phys. 1860, 59, 466-72) using a combination of $KClO_2$ and $HNO_3$, or a Staudenmaier method (e.g., as provided in Staudenmaier L. Verfahren zurdarstellung der graphitsaure, Ber Dtsch. Chem. Ges. 1898, 31, 1481-99), or by a Hummers method (e.g., as provided in Hummers W. Offeman W., Preparation of graphite oxide, J. Am. Chem. Soc. 1958, 80, 1339) using $KMnO_4$ and $H_2SO_4$ the contents of each of which are incorporated herein by reference in their entirety.

The carbonaceous material layer may have a multi-layer structure, e.g., including two or more layers grown by chemical vapor deposition (CVD) using a graphitization catalyst on a substrate.

For example, a graphitization catalyst may be disposed as a film on a substrate, and then heat treated while a gaseous carbon source is contacted thereto, thereby forming graphene, and then, the graphene is grown, and then cooled. That is, when a heat treatment is performed at a selected temperature for a selected period of time while a gaseous carbon source is supplied at a selected pressure into a chamber in which a graphitization catalyst is present, carbon atoms of the carbon source may be bonded to each other to form a hexagonal plate-shaped structure, thereby forming graphene, and then the graphene may be cooled at a selected cooling rate, thereby forming graphene having a planar layered-structure and having a uniform arrangement.

The graphene having a planar layered-structure is a polycrystal and defects having structures of a five-membered ring to a seven-membered ring may be formed when domains of the graphene layer grown by chemical vapor deposition ("CVD") are aligned or connected each other. However, a graphene oxide ("GO") or a reduced graphene oxide ("rGO") having a planar layered-structure which is grown by chemical vapor deposition ("CVD") may have macrograins in the grain boundary and defects of the graphene oxide ("GO") layer or the reduced graphene oxide ("rGO") layer may be formed during an oxidation/reduction process. Charging/discharging occurs due to deposition/dissolution of Li ions by the macrograins and the defects. The substrate may comprise at least one selected from an inorganic substrate and a metal substrate. The inorganic substrate may comprise, for example, at least one selected from a Si substrate, a glass substrate, a GaN substrate, a silica substrate, and the like, and the metal substrate may comprise, for example, at least one selected from a Ni, Cu, or W substrate, but the inorganic and metal substrates are not limited thereto. Also, a blocking layer may be disposed on the substrate between the substrate and the graphitization catalyst. The blocking layer may be effective to effectively or substantially prevent an undesirable reaction with the graphitization catalyst. The blocking layer may be disposed on the substrate by, for example, disposing, e.g., forming, at least one selected from SiOx wherein x is about 1 to about 2, TiN, $Al_2O_3$, $TiO_2$, $Si_3N_4$, and the like, by sputtering or the like. A thickness of the blocking layer may be in a range of, for example, about 0.1 nm to about 1000 micrometers (μm), specifically about 1 nm to about 100 μm, more specifically about 10 nm to about 10 μm.

The graphitization catalyst may include at least one selected from Ni, Co, Fe, Pt, Au, Al, Cr, Cu, Mg, Mn, Mo, Rh, Si, Ta, Ti, W, U, V, and Zr, but is not limited thereto. While not wanting to be bound by theory, it is understood that when contacted with the carbon source, the graphitization catalyst helps carbon atoms supplied from the carbon source bond to each other to form a hexagonal plate-shaped structure. The graphitization catalyst may have a plate-shaped structure and may consist of at least one selected from Ni, Co, Fe, Pt, Au, Al, Cr, Cu, Mg, Mn, Mo, Rh, Si, Ta, Ti, W, U, V, and Zr. Alternatively, the graphitization catalyst may be disposed on a substrate by, for example, deposition or sputtering.

The carbon source may comprise carbon or any suitable material that may exist in the form of a gas, e.g., a vapor, at a temperature of about 300° C. or more, e.g., about 310° C. to about 1000° C. A heat treatment temperature may be, for example, about 300° C. to about 2000° C., or about 500° C. to about 1500° C. In this regard, a degree of graphene formation, that is, a thickness of the graphene, may be selected by maintaining a selected temperature for a selected period of time during heat treating, and the graphene, which has a layered structure, may be used after being separated from the substrate. Also, if desired, the graphitization catalyst can be dissolved and removed by an acid treatment.

The carbonaceous material layer may be in the form of a thin film. Also, as is further disclosed above, the platy structure of the carbonaceous material layer comprises thin plate-like pieces of the carbonaceous material.

A thickness of the carbonaceous material layer may be in a range of about 1 nm to about 10 μm, for example, about 1 nm to about 1 μm. When the thickness of the carbonaceous material layer is 1 nm or less, it can be difficult to physically prevent a reaction with an electrolyte due to the thickness of the film, and when the thickness of the carbonaceous material layer is 10 μm or more, the carbonaceous material layer may undesirably increase a volume of a battery.

A thickness of the carbonaceous material layer may be in a range of about 1 nm to about 100 nm, specifically about 2 nm to about 90 nm, more specifically about 4 nm to about 80 nm.

The carbonaceous material layer may have a specific surface area of about 25 square meters per gram ($m^2$/g) to about 500 $m^2$/g, specifically about 50 $m^2$/g to about 400 $m^2$/g, more specifically about 75 $m^2$/g to about 300 $m^2$/g. For example, the carbonaceous material layer may have a specific surface area of about 60 $m^2$/g to about 450 $m^2$/g. A carbonaceous material layer having a thickness in the foregoing range and a specific surface area in the foregoing range may be effective for physically and/or chemically preventing a reaction with an electrolyte and reducing a change to a volume of a battery. Also, such a carbonaceous material layer may allow lithium ions to move easily between the metal layer and the electrolyte, improving the electrochemical characteristics of the battery comprising the negative electrode.

An amount of the carbonaceous material layer may be in a range of about 0.03 gram per square centimeter (g/$cm^2$) to about 4 g/$cm^2$, specifically about 0.07 g/$cm^2$ to about 2 g/$cm^2$, more specifically about 0.09 g/$cm^2$ to about 1 g/$cm^2$. When the amount of the carbonaceous material layer is in this range, the carbonaceous material layer may be homogenously formed, and thus, a reaction with an electrolyte may be physically and/or chemically prevented and distortion of a current density may be decreased.

The carbonaceous material layer may additionally include a binder. The binder may improve adhesive strength between the metal layer including lithium and a carbonaceous material, and may enable lithium ions to intercalate or deintercalate more easily.

The binder may include at least one selected from a vinylidene fluoride/hexafluoropropylene copolymer, polyvinylidenefluoride, polyacrylonitrile, polymethylmethacrylate, polytetrafluoroethylene, polyimide, polyamide imide, polyacrylic acid, polyvinyl alcohol, a styrene butadiene rubber-based polymer, acrylonitrile-butadiene rubber, acrylonitrile-butadiene-styrene rubber, acrylate-based rubber, hydroxypropylmethylcellulose, and sodium carboxymethylcellulose ("CMC"). For example, the binder may comprise at least one selected from a vinylidene fluoride/hexafluoropropylene copolymer, polyvinylidenefluoride, polyacrylonitrile, polymethylmethacrylate, polytetrafluoroethylene, but is not limited thereto. Polyvinylidene fluoride is specifically mentioned.

An amount of the binder included in the carbonaceous material layer may be in a range of about 5 parts by weight to about 50 parts by weight, based on 100 parts by weight of the carbonaceous material. For example, the amount of the binder may be in a range of about 5 parts by weight to about 40 parts by weight, for example, 10 parts by weight to 40 parts by weight, based on 100 parts by weight of the carbonaceous material. When the amount of the binder is within this range, a mechanical strength with respect to the metal layer including lithium may be increased, and the carbonaceous material layer including the binder may easily respond to a volumetric change which may occur during charge and discharge.

The metal layer including lithium may comprise at least one selected from a lithium metal and a lithium-alloyable metal. The lithium-alloyable metal may include at least one metal selected from Si, In, Pb, Ga, Ge, Sn, Al, Bi, and Sb. The metal layer including lithium may have at least 10 times greater specific capacity than a graphite electrode layer due to its high storage capacity of lithium. In an embodiment, the specific capacity of the negative electrode is about 1 ampere-hour per gram (Ah/g) to about 4 Ah/g, specifically about 1.5 Ah/g to about 3.5 Ah/g.

The carbonaceous material layer may be effective as a protective layer for preventing deterioration of the metal layer, e.g., when contacted with an electrolyte.

In an embodiment, the lithium battery includes a positive electrode, an electrolyte, and a negative electrode, wherein the negative electrode includes the metal layer including lithium, and the platy carbonaceous material layer comprising a carbonaceous material having a plate structure and disposed, e.g., formed, on the metal layer.

The shape of the lithium battery is not limited, and may be, for example, a coin shape, a button shape, a sheet shape, a stack shape, a cylindrical shape, a prismatic shape, a flat shape, or a conic shape, but is not limited thereto. A structure and a manufacturing method according to the shape of the lithium battery may be determined by one of skill in the art without undue experimentation, and thus further detailed description thereof is not presented herein.

In an embodiment of the lithium battery, the negative electrode including the metal layer including lithium and the platy carbonaceous material layer comprising a carbonaceous material having a plate structure formed on the metal layer may be disposed on an inner portion of a negative electrode case, the positive electrode may be disposed on an inner portion of a positive electrode case, a separator may be disposed between the negative electrode and the positive electrode, and a space between the positive electrode and the separator may be filled with the electrolyte.

The metal layer including lithium may include a layer comprising at least one selected from lithium metal and lithium-alloyable metal, as is further disclosed above.

The negative electrode may be manufactured by disposing, e.g., coating, the carbonaceous material layer on the layer comprising at least one selected from lithium metal and the lithium-alloyable metal, followed by drying at a temperature of about 50° C. to about 100° C., specifically about 60° C. to about 90° C., more specifically about 70° C. to about 80° C. In an embodiment, the method of manufacturing a negative electrode comprises providing a metal layer comprising lithium; providing a carbonaceous material layer comprising a carbonaceous material; and disposing the carbonaceous material layer on the metal layer to manufacture the negative electrode.

For example, at least one carbonaceous material selected from graphene, graphene oxide, reduced graphene oxide, a nano-scale graphene platelet, and functionalized graphene may be coated on a surface of the lithium metal layer to form a carbonaceous material layer. For example, the carbonaceous material may be graphene oxide or reduced graphene oxide.

Graphene oxide may be obtained by the Brodie method, the Staudenmaier method, or the Hummers method, as further disclosed above, each which are known in the art and the details of which can be determined by one of skill in the art without undue experimentation. For example, graphene oxide may be obtained by adding $KMnO_4$ to a mixture of graphite and $H_2SO_4$ to oxidize graphite, followed by removing the residue, centrifuging, and collecting precipitated particles.

Reduced graphene oxide may be prepared as follows. Graphene oxide is dispersed in at least one selected from water and an organic solvent by sonication and/or mechanical milling or abrasion to provide a graphene oxide solution. The graphene oxide solution is then reduced using a reducing agent, followed by centrifuging to yield the reduced graphene oxide.

Any suitable reducing agent may be used to form the reduced graphene oxide. For example, the reducing agent may be at least one selected from $NaBH_4$, $N_2H_4$, HI-acetic acid, $LiAlH_4$, tetra-n-butylammonium bromide ("TBAB"), ethyleneglycol, polyethyleneglycol, Na, an ascorbic acid, and glucose.

Also, the reduced oxide graphene may be obtained by removing a functional group, such as a functional group containing oxygen, by heat treating at a temperature of 200° C. or more under a vacuum, an inert atmosphere ($N_2$, Ar), or a reducing atmosphere, and then the reduced oxide graphene may be obtained by contacting with an organic solvent to provide a dispersion in the organic solvent.

Any suitable coating method may be used. The coating method may include spin coating, dip coating, spray coating, or drop coating, but is not limited thereto.

The negative electrode may be formed by, for example, drop coating the graphene oxide solution or reduced graphene oxide, followed by drying at a temperature of about 50° C. to about 100° C., specifically about 60° C. to about 90° C., more specifically about 70° C. to about 80° C.

Also, the carbonaceous material layer may include the carbonaceous material layer described above.

The lithium battery may be manufactured by, for example, winding a stack of the negative electrode, the positive electrode, and the separator, which are sequentially disposed in this stated order, in a jelly-roll shape, followed by placing them in a battery case.

The positive electrode includes a positive active material, a conductive agent, and a binder.

The positive active material may include any suitable compound that can intercalate and deintercalate lithium ions. For example, the positive active material may be any suitable lithium-containing metal oxides that is used in the art. For example, the positive active material may comprise at least one oxide of lithium and at least one metal selected from cobalt, manganese, and nickel. A detailed example of the positive active material may be a compound represented by any one of the following formulas:

$Li_aA_{1-b}M_bD_2$ (wherein $0.90 \leq a \leq 1.8$, and $0 \leq b \leq 0.5$);

$Li_aE_{1-b}M_bO_{2-c}D_c$ (wherein $0.90 \leq a \leq 1.8$, $0 \leq b \leq 0.5$, and $0 \leq c \leq 0.05$);

$LiE_{2-b}M_bO_{4-c}D_c$ (wherein $0 \leq b \leq 0.5$, and $0 \leq c \leq 0.05$);

$Li_aNi_{1-b-c}Co_bM_cD_\alpha$ (wherein $0.90 \leq a \leq 1.8$, $0 \leq b \leq 0.5$, $0 \leq c \leq 0.05$, and $0 < \alpha \leq 2$);

$Li_aNi_{1-b-c}Co_bM_cO_{2-\alpha}X_\alpha$ (wherein $0.90 \leq a \leq 1.8$, $0 \leq b \leq 0.5$, $0 \leq c \leq 0.05$, and $0 < \alpha < 2$);

$Li_aNi_{1-b-c}Co_bM_cO_{2-\alpha}X_2$ (wherein $0.90 \leq a \leq 1.8$, $0 \leq b \leq 0.5$, $0 \leq c \leq 0.05$, and $0 < \alpha < 2$);

$Li_aNi_{1-b-c}Mn_bM_cD_\alpha$ (wherein $0.90 \leq a \leq 1.8$, $0 \leq b \leq 0.5$, $0 \leq c \leq 0.05$, and $0 < \alpha \leq 2$);

$Li_aNi_{1-b-c}Mn_bM_cO_{2-\alpha}X_\alpha$ (wherein $0.90 \leq a \leq 1.8$, $0 \leq b \leq 0.5$, $0 \leq c \leq 0.05$, and $0 < \alpha < 2$);

$Li_aNi_{1-b-c}Mn_bM_cO_{2-\alpha}X_2$ (wherein $0.90 \leq a \leq 1.8$, $0 \leq b \leq 0.5$, $0 \leq c \leq 0.05$, and $0 < \alpha < 2$);

$Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$);

$Li_aNi_bCo_cMn_dG_eO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$);

$Li_aNiG_bO_2$ (wherein $0.90 \leq a \leq 1.8$, and $0.001 \leq b \leq 0.1$);
$Li_aCoG_bO_2$ (wherein $0.90 \leq a \leq 1.8$, and $0.001 \leq b \leq 0.1$);

$Li_aMnG_bO_2$ (wherein $0.90 \le a \le 1.8$, and $0.001 \le b \le 0.1$);

$Li_aMn_2G_bO_4$ (wherein $0.90 \le a \le 1.8$, and $0.001 \le b \le 0.1$);

$QO_2$;

$QS_2$;

$LiQS_2$;

$V_2O_5$;

$LiV_2O_5$;

$LiIO_2$; $LiNiVO_4$;

$Li_{(3-f)}J_2(PO_4)_3 (0 \le f \le 2)$;

$Li_{(3-f)}Fe_2(PO_4)_3 (0 \le f \le 2)$; and $LiFePO_4$.

In the formulas above, A is at least one selected from Ni, Co, and Mn; M is at least one selected from Al, Ni, Co, Mn, Cr, Fe, Mg, Sr, V, and a rare-earth element; D is at least one selected from O, F, S, and P; E is at least one selected from Co, and Mn; X is at least one selected from F, S, and P; G is at least one selected from Al, Cr, Mn, Fe, Mg, La, Ce, Sr, and V; Q is at least one selected from Ti, Mo, and Mn; I is at least one selected from Cr, V, Fe, Sc, and Y; and J is at least one selected from V, Cr, Mn, Co, Ni, and Cu.

For example, the positive active material may be at least one selected from $LiCoO_2$, $LiMn_xO_{2x}$ (x=1, 2), $LiNi_{1-x}Mn_xO_{2x}$ (0<x<1), $LiNi_{1-x-y}Co_xMn_yO_2$ ($0 \le x \le 0.5$, $0 \le y \le 0.5$), and $LiFePO_4$, and the like.

The positive active material may have a coating layer on a surface thereof, and the positive active material may be combined with a compound having a coating layer to provide the positive active material. The coating layer may include at least one selected from an oxide, a hydroxide, an oxyhydroxide, an oxycarbonate, and a hydroxycarbonate of at least one selected from Mg, Al, Co, K, Na, Ca, Si, Ti, V, Sn, Ge, Ga, B, As, and Zr. The coating layer may be amorphous or crystalline. The coating layer may be formed using any suitable coating method, wherein the suitable method does not substantially affect desirable properties of the positive active material. Spray coating and immersion are specifically mentioned. The details of suitable coating methods can be determined by one of skill in the art without undue experimentation, and thus further details are not provided herein.

The conductive agent may comprise any suitable conductive agent, and may comprise at least one selected from graphite, carbon black, amorphous carbon, carbon fiber, and carbon nanotubes. Carbon black is specifically mentioned. The binder may comprise at least one selected from a vinylidene fluoride/hexafluoropropylene copolymer, polyvinylidene-fluoride, polyacrylonitrile, polymethylmethacrylate, polytetrafluoroethylene, polyimide, polyamide imide, styrene butadiene rubber-based polymer, acrylate-based rubber, and sodium carboxymethylcellulose. The positive active material, conductive agent, and binder may be combined with a solvent to provide a slurry. Any suitable solvent may be used. The solvent may comprise at least one selected from N-methylpyrrolidone, acetone, and water.

Suitable amounts of the positive active material, the conductive agent, the binder, and the solvent may be the same as commercially used in a lithium battery and can be determined by one of skill in the art without undue experimentation. If desired, e.g., according to the use and/or construction of a lithium battery, one or more of the conductive agent and the binder may be omitted.

Also, a lithium electrode may be used as the positive electrode.

A separator may be interposed between the positive electrode and the negative electrode.

As a separator, any suitable material, e.g., a material that is commercially used in a lithium battery, may be used. The separator may have a low resistance to movement of electrolytic ions and excellent electrolyte-retaining properties. For example, the separator may comprise at least one selected from glass fiber, polyester, Teflon®, polyethylene, polypropylene, and polytetrafluoroethylene ("PTFE"). The separator may be non-woven form and/or woven. In detail, a separator for a lithium ion battery may be a windable separator comprising polyethylene and/or polypropylene, and a separator for a lithium ion polymer battery may be a separator having excellent organic electrolyte-retaining properties.

The separator may be manufactured by, for example, the following method. A separator composition may be prepared by mixing a polymer resin, a filler, and a solvent to provide a separator composition, and the separator composition may be directly coated on an electrode, followed by drying, thereby forming a separator film. Alternatively, the separator composition may be cast onto a support, followed by drying to provide a separator film, and then the separator film may be exfoliated from the support and laminated on a upper electrode to form a separator.

The polymer resin is not particularly limited, and may comprise any suitable material that is used as a binder of an electrode plate. Examples thereof include at least one selected from a vinylidenefluoride/hexafluoropropylene copolymer, polyvinylidenefluoride, polyacrylonitrile, and polymethylmethacrylate. For example, the polymer resin may be a vinylidenefluoride/hexafluoropropylene copolymer in which an amount of hexafluoropropylene is in a range of about 8 to about 25 weight percent (wt %), specifically about 10 to about 23 wt %, more specifically about 12 to about 21 wt %, based on the total weight of the polymer resin.

The carbonaceous material layer may be disposed on a side of the negative electrode which faces the separator.

The electrolyte may be an aqueous electrolyte or a non-aqueous electrolyte.

The non-aqueous electrolyte may include a lithium salt and an organic solvent.

The lithium salt may be dissolved in an organic solvent, and may function as a source of lithium ions in a battery, thereby enabling movement of lithium ions between the positive electrode and the negative electrode.

The lithium salt may include, for example, at least one selected from $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers, e.g., 1 to about 6), LiCl, LiI, and $LiB(C_2O_4)_2$, e.g., lithium bis(oxalato)borate (LiBOB). A concentration of the lithium salt may be in a range of about 0.1 to about 2.0 molar (M), specifically about 0.2 to about 1.5 M. When the concentration of the lithium salt is within this range, a prepared electrolyte may have suitable conductivity and viscosity, and thus, may have excellent electrolyte properties.

The organic solvent may comprise an aprotic solvent. The organic solvent may include at least one selected from a carbonate-based solvent, an ester-based solvent, an ether-based solvent, a ketone-based solvent, an alcohol-based solvent, a nitrile, a cyclic hydrocarbon, an amide, an organosulfur-based solvent (e.g., a sulfone), and an organophosphorous-based solvent. Examples of the carbonate-based solvent include at least one selected from dimethyl carbonate ("DMC"), diethyl carbonate ("DEC"), di-n-propyl carbonate ("DPC"), methyl n-propyl carbonate ("MPC"), ethyl n-propyl carbonate ("EPC"), ethyl methyl carbonate ("EMC"), ethylene carbonate ("EC"), propylene carbonate ("PC"), and butylene carbonate ("BC"). Examples of the ester-based solvent include at least one selected from methyl acetate, ethyl acetate, n-propyl acetate, dimethylacetate, methyl n-propionate, ethyl n-propionate, γ-butyrolactone, 5-decanolide, γ-valerolactone, dl-mevalonolactone, and ε-caprolactone. Examples of the ether-based solvent include at least one selected from dibutyl ether, tetraglyme, diglyme, dimethoxyethane, 2-methyltetrahydrofurane, dioxolane, dioxane, and tetrahydrofuran, and an example of the ketone-based solvent is cyclohexanone. Examples of the alcohol-based solvent include at least one selected from methanol, ethyl alcohol, propanol, butanol, and isopropyl alcohol. Examples of the nitrile include compounds of the formula R—CN (wherein R is a $C_2$ to $C_{20}$ linear, branched, or cyclic hydrocarbon, and may include a double-bonded cyclic ring or ether bond). Examples of the amide include dimethylformamide. Examples of the dioxolane include 1, 3-dioxolane. Examples of the sulfone include sulfolane.

The organic solvent may be used alone or in combination, and when used in combination, a ratio of the solvents may be appropriately selected without undue experimentation. For example, the carbonate-based solvent ethylene carbonate and propylene carbonate may be used in a volumetric ratio of about 1:1 to about 1:9; specifically 1:1 to 9:1, for example, 7:3 to 1:9, or 3:7 to 9:1. Also, for example, a carbonate-based solvent and an ester-based solvent may be used in combination, and a volumetric ratio of the carbonate-based solvent and the ester-based solvent in a mixture may be about 1:1 to about 1:9; specifically 1:1 to 9:1, for example, 7:3 to 1:9, or 3:7 to 9:1. However, the volumetric ratio is not limited thereto. In an embodiment, for example, at least two ester-based solvents may be used.

The lithium battery may be a primary lithium battery or a secondary lithium battery.

The lithium battery may be a lithium sulfur battery.

Figure 1:
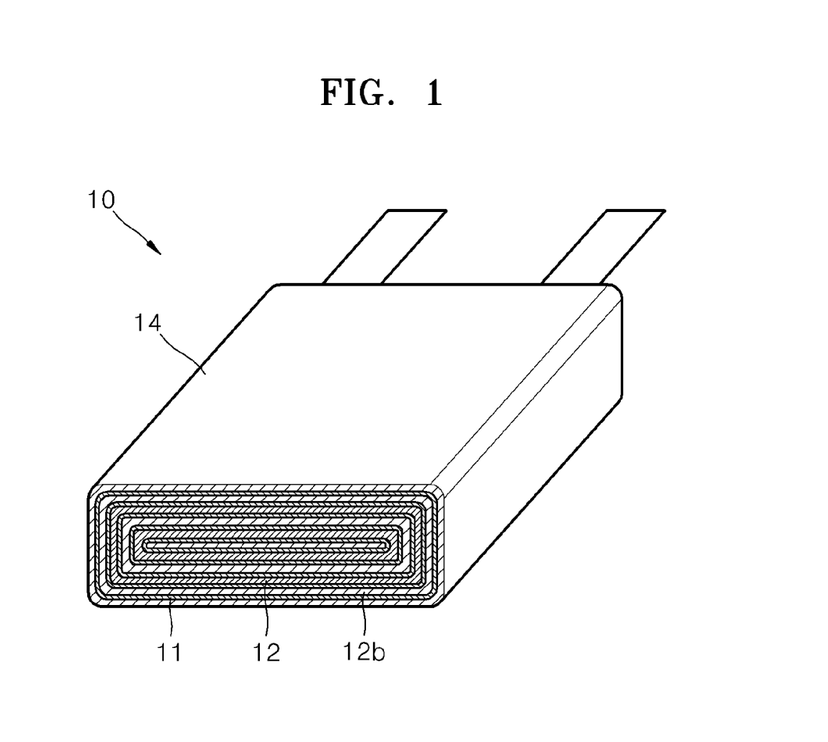
FIG. 1 is a schematic view of an embodiment of a lithium sulfur battery.

FIG. 1 is a schematic view of an embodiment of a lithium sulfur battery 10. Referring to FIG. 1, the lithium sulfur battery 10 includes a positive electrode 11, a negative electrode 12 including a carbonaceous material layer 12b having a plate structure, and a battery can 14 housing the positive and negative electrodes 11 and 12, respectively.

The positive electrode 11 includes a positive active material, a conductive agent, and a binder.

The positive active material included in the positive electrode 11 may comprise at least one selected from elemental sulfur (e.g., $S_8$) and a sulfur-based compound.

The sulfur-based compound may be at least one selected from selected from $Li_2S_n$ (wherein n≥1), an organic sulfur compound, and a carbon-sulfur polymer (e.g., $(C_2S_x)_n$, wherein x=2.5 to 50, and n≥2). The conductive agent and the binder may be the same as presented above.

The negative electrode 12 including the carbonaceous material layer 12b having a plate structure may be a negative electrode including a metal layer including lithium and a carbonaceous material layer disposed on the metal layer including lithium, and the structure and manufacturing method of the negative electrode 12 may be the same as presented above.

Although not illustrated in FIG. 1, the lithium sulfur battery 10 may comprise an electrolyte comprising an organic solvent including a lithium salt, and may further include a separator between the positive electrode 11 and the negative electrode 12.

As a lithium salt, at least one selected from lithium perchlorate ($LiClO_4$), lithium tetrafluoroborate ($LiBF_4$), lithium hexafluorophosphate ($LiPF_6$), lithium trifluoromethanesulfonate ($LiSO_3CF_3$), and lithium bistrifluoromethanesulfonylamide ($LiN(CF_3SO_2)_2$ may be used. A concentration of a lithium salt may be in a range of about 0.1 to about 2.0 M. When the concentration of the lithium salt is within this range, the electrolyte may have suitable conductivity and viscosity, and thus, have excellent electrolyte properties.

The organic solvent may comprise at least one selected from benzene, fluorobenzene, toluene, trifluorotoluene ("FT"), xylene, cyclohexane, tetrahydrofurane ("THF"), 2-methyltetrahydrofurane ("2-MeTHF"), ethanol, isopropyl alcohol ("IPA"), methylpropionate ("MP"), ethylpropionate ("EP"), methylacetate ("MA"), ethylacetate ("EA"), propylacetate ("PA"), dimethylester ("DME"), 1,3-dioxolane, diglyme ("DGM"), tetraglyme ("TGM"), dimethoxyethane, gammabutyrolactone ("GBL"), sulfolane, phosphoamide, pyridine, N,N-diethylacetamide, N,N-diethylformamide, dimethylsulfoxide, tetramethylurea, N,N-dimethylacetamide, N,N-dimethylformamide, tributylphosphate, trimethylphosphate, and tetramethylenediamine. When the organic solvents are used in combination, a ratio thereof may be appropriately selected according to a desired battery performance. For example, dimethoxyethane and 1,3-dioxolane may be used in a volumetric ratio of about 9:1 to about 1:1, and also, for example, 1,3-dioxolane, diglyme, dimethoxyethane, and sulfolane may be used in a volumetric ratio of about 1:about 1:about 1:about 1 to about 5:about 2:about 2:about 1. However, the organic solvent is not limited thereto.

As a separator, a polymer film, such as polyethylene or polypropylene, or a multi-layered film thereof may be used. A separator composition may be prepared by mixing, for example, a polymer resin, a filler, and a solvent.

The polymer resin is not particularly limited, and may be any suitable material that is used as a binder of an electrode plate. For example, at least one selected from a vinylidene-fluoride/hexafluoropropylene copolymer, polyvinylidenefluoride, polychlorotrifluoroethylene, an ethylene-tetrafluoroethylene copolymer, an ethylene-chlorotrifluoroethylene copolymer, a polyvinylfluoride, vinylfluoride-hexafluoropropylene copolymer, ethylene-vinylfluoride copolymer, and an ethylene-vinylidenefluoride copolymer may be used. In addition to these materials, at least one plasticizer selected from ethylene carbonate, propylene carbonate, dimethyl carbonate, diethoxyethane, dibutyl phthalate, dimethoxyethane, diethyl carbonate, dipropyl carbonate, and vinylidene carbonate may be used to control porosity.

Also, when an inorganic filler is included in the separator, mechanical properties and ionic conductivity of the separator may be increased. Examples of the inorganic filler are silica, alumina, zirconia, yttrium oxide, clay, and zeolite.

The lithium battery may be a lithium air battery.

The positive electrode of the lithium battery may use oxygen as a positive active material.

Figure 2:
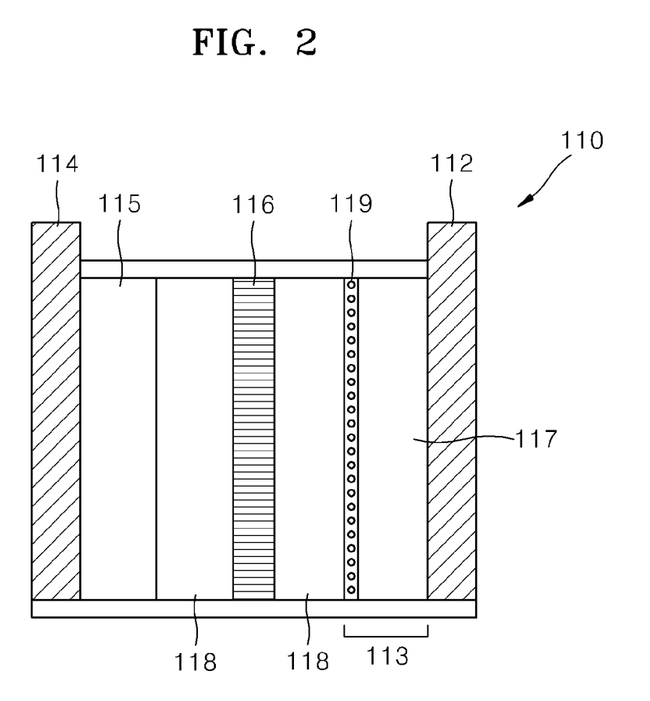
FIG. 2 is a schematic view of an embodiment of a lithium air battery.

FIG. 2 is a schematic view of an embodiment of a lithium air battery 110;

Referring to FIG. 2, an electrolyte 118 is interposed between a negative electrode 113 and a positive electrode 115. The negative electrode 113 includes a lithium-including metal layer 117 which is disposed adjacent to a first current collector 112, and a carbonaceous material layer 119 with a plate structure disposed on the lithium-including metal layer 117. The positive electrode 115 is disposed on a second current collector 114 and uses oxygen as a positive active material. A lithium ion conductive solid electrolyte film 116 may be interposed between the negative electrode 113 and the positive electrode 115, and a separator (not shown) may be disposed between the lithium ion conductive solid electrolyte film 116 and the positive electrode 115, and/or between the lithium ion conductive solid electrolyte film 116 and the carbonaceous material layer 119.

The first current collector 112 may comprise any suitable conductive material. For example, at least one selected from copper, stainless steel, and nickel may be used, and the conductive material for forming the first current collector 12 is not limited thereto. The shape of the first current collector 112 may be, for example, at least one selected from a thin film shape, a plate shape, a mesh shape, and a grid shape, but is not limited thereto.

The negative electrode 113 includes the lithium-including metal layer 117, which comprises at least one selected from lithium metal and a lithium metal-based alloy, and the carbonaceous material layer 119 with a plate structure formed on the lithium-including metal layer 117. The structure and manufacturing method of the negative electrode 113 may be the same as presented above.

The negative electrode 113 may further include a binder. As a binder, for example, at least one selected from polyvinylidene fluoride ("PVdF"), polytetrafluoroethylene ("PTFE"), and the like may be used. An amount of the binder may not be limited, and for example, may be about 30 wt % or less, and in particular, may be in a range of about 1 to about 20 wt %, specifically about 1 to about 10 wt %.

The second current collector 114 may be porous and function as a gas diffusion layer that enables air to diffuse therethrough, and be conductive. The current collector may comprise any suitable material, examples thereof include at least one selected from stainless steel, nickel, aluminum, iron, titanium, carbon, and the like. The shape of the second current collector 114 may any suitable shape, and may be, for example, at least one selected from a thin film shape, a plate shape, a mesh shape, and a grid shape, but is not limited thereto. For example, the second current collector 114 may have a mesh shape. The mesh shape may provide excellent collecting efficiency.

The positive electrode 115 using oxygen as a positive active material (not shown) may include a catalyst for oxidizing and reducing oxygen, which is not illustrated. Also, the positive electrode 115 may further include at least one selected from WC, WC fused cobalt, $CoWO_4$, $FeWO_4$, NiS, and $WS_2$.

The positive electrode 115, which uses oxygen as a positive active material, may further include a binder. The type or amount of the binder may be the same as presented above with reference to the negative electrode 113, and thus, the above disclosure will not be repeated.

The electrolyte 118 may be a non-aqueous electrolyte. As the non-aqueous electrolyte, a water-free, i.e., non-aqueous, organic solvent may be used, and the organic solvent may be as described above. In an embodiment, the organic solvent may be an aprotic solvent. In an embodiment, the organic solvent may comprise at least one selected from a carbonate-based solvent, an ester-based solvent, an ether-based solvent, a ketone-based solvent, an organosulfur-based solvent, and an organophosphorous-based solvent, but the non-aqueous organic solvent is not limited thereto. Suitable organophosphorous solvents may include at least one selected from trimethyl phosphate, triethyl phosphate, tris(2-chloroethyl) phosphate, tris(2,2,2-trifluoroethyl) phosphate, tripropyl phosphate, triisopropyl phosphate, tributyl phosphate, trihexyl phosphate, triphenyl phosphate and tritolyl phosphate. The organic solvent may be used alone or in combination, and when at least two are used in combination, a ratio thereof may be appropriately selected without undue experimentation.

The non-aqueous organic solvent may include a lithium salt, and the lithium salt may be dissolved in the organic solvent, and may function as a lithium ion source in a battery, for example, to allow movement of lithium ions between the negative electrode 113 and the lithium ionic conductive solid electrolyte film 116. As a lithium salt, at least one selected from $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers, e.g., 1 to about 6), LiF, LiBr, LiCl, LiI and $LiB(C_2O_4)_2$, e.g., lithium bis(oxalato) borate (LiBOB) may be used. A concentration of the lithium salt may be in a range of about 0.1 to about 2.0 M, specifically about 0.2 to about 1.5 M. When the concentration of the lithium salt is within this range, an electrolyte may have a suitable conductivity and viscosity, and thus, have excellent electrolyte properties. The non-aqueous organic solvent may further include a metal salt other than the lithium salts, and for example, the non-aqueous organic solvent may further include at least one selected from $AlCl_3$, $MgCl_2$, NaCl, KCl, NaBr, KBr, and $CaCl_2$.

Also, the lithium ion conductive solid electrolyte film 116 may be disposed between the negative electrode 113 and the positive electrode 115. The lithium ion conductive solid electrolyte film 116 may function as a protective layer for preventing water included in an aqueous electrolyte, or adventitious water included in a non-aqueous electrolyte, from directly contacting and reacting with lithium included in the negative electrode 113. The lithium ion conductive solid electrolyte film 116 may include, for example, an inorganic material, such as at least one selected from a lithium ion conductive glass, and a lithium ion conductive crystal (e.g., a ceramic or a glass-ceramic). An embodiment in which the lithium ion conductive solid electrolyte film 116 is an oxide is specifically mentioned. The oxide may provide suitable chemical stability.

Examples of a lithium ion conductive crystal include $Li_{1+x+y}(Al, Ga)_x(Ti, Ge)_{2-x}Si_yP_{3-y}O_{12}$ (wherein $0 \le x \le 1$, and $0 \le y \le 1$, for example $0 \le x \le 0.4$, and $0 < y \le 0.6$, or $0.1 \le x \le 0.3$, and $0.1 < y \le 0.4$). Examples of the lithium ion conductive glass-ceramic include at least one selected from lithium-aluminum-germanium-phosphate (LAGP), lithium-aluminum-titanium-phosphate (LATP), and lithium-aluminum-titanium-silicon-phosphate (LATSP). The lithium ion conductive solid electrolyte film 116 may further include, in addition to the glass-ceramic component, a polymer solid electrolyte. An example of a polymer solid electrolyte is a lithium salt-doped polyethylene oxide, wherein as the lithium salt, at least one selected from $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, and the like may be used.

Also, a separator (not shown) may be disposed between the lithium ion conductive solid electrolyte film 116 and the positive electrode 115, and/or between the lithium ion conductive solid electrolyte film 116 and the carbonaceous material layer 119. As a separator available herein, any suitable material that is sufficiently durable when used in a lithium air battery may be used. For example, at least one selected from a non-woven polymer, such as non-woven polypropylene or a non-woven polyphenylene sulfide, a porous film comprising, for example, an olefin-based resin, such as polyethylene or polypropylene, may be used. However, the separator is not limited thereto, and these materials may be used in combination.

The term "air" used herein is not limited to atmospheric air, and may refer to any gas combination including oxygen, or pure oxygen gas. Such a broad definition of the term "air" may also be applied to any application, for example, an air battery, an air positive electrode, or the like.

Hereinafter, the following Examples are presented for illustrative purpose only, and shall not limit the scope of the present invention.

EXAMPLES

Preparation of Carbonaceous Material

Example 1

10 grams (g) of pure graphite (purity 99.999%, +100 mesh, product of Sigma-Aldrich Company) was mixed with 150 mL of sulfuric acid (97%, product of Sigma-Aldrich Company). The mixture was stirred for 24 hours, and then oxidized by adding 31.5 g of $KMnO_4$ thereto. The oxidized mixture was mixed with 35 milliliters (mL) of $H_2O_2$ (50%, product of Sigma-Aldrich Company) to remove the residue of $K^+$, $Mn_2O$, $O_3$, and $O^-$, and then, the mixture from which the residue was removed was centrifuged at 4,000 revolutions per minute ("RPM") for 30 minutes, and small particles floating in the solution were removed therefrom, and precipitated particles were collected, followed by drying under vacuum conditions at a temperature of 80° C. for 24 hours, thereby completing the preparation of graphene oxide.

Example 2

0.1 g of the graphene oxide prepared according to Example 1 was dispersed in 400 mL of water having a pH of 9 using sonication to prepare a graphene oxide solution. 400 mL of the dispersed graphene oxide solution was mixed with 4 mL of $N_2H_4$ as a reducing agent, followed by heating using a microwave having an output power of 800 watts (W) for 60 minutes to reduce graphene oxide. Thereafter, the solution was centrifuged at 4,000 RPM for 30 minutes to separate a reduced graphene oxide, followed by washing with 50 mL of methanol and 50 mL of water, centrifuging at 4,000 RPM for 30 minutes, and drying the resulting product at room temperature to complete the preparation of reduced graphene oxide.

Example 3

0.5 g of a solution of 5 wt % polyvinylidene fluoride ("PVdF") in N-methylpyrrolidone ("NMP") was added to 0.1 g of the graphene oxide prepared according to Example 1, followed by mixing in a mortar to prepare a graphene oxide-PVdF solution.

Example 4

0.5 g of a solution of 5 wt % PVdF in NMP was added to 0.1 g of the reduced graphene oxide prepared according to Example 2, followed by mixing in a mortar to prepare a reduced graphene oxide-PVdF solution.

Manufacture of Lithium Battery

Example 5

0.04 mL of the graphene oxide-PVdF solution prepared according to Example 3 was homogeneously dropped on a lithium metal layer to perform a drop coating, followed by drying at a temperature of 60° C. in a vacuum oven to manufacture a negative electrode in which the graphene oxide-PVdF protective layer was disposed on the lithium metal layer. The amount of the graphene oxide-PVdF protective layer was 3.27 milligrams per square centimeter ($mg/cm^2$) of the lithium metal layer. The negative electrode was assembled with a lithium metal electrode as a counter electrode, a separator (manufactured by Tonen Company) having a thickness of 0.52 millimeters (mm) of polypropylene oxide, and an electrolyte (1.0 M $LiPF_6$ and a mixture of ethylene carbonate ("EC") and diethyl carbonate ("DEC") in a volumetric ratio of 3:7) to manufacture a coin half-cell.

Example 6

A coin half-cell was manufactured in the same manner as in Example 5, except that the reduced graphene oxide-PVdF solution prepared according to Example 4 was used instead of the graphene oxide-PVdF solution prepared according to Example 3 to manufacture a negative electrode in which the reduced graphene oxide-PVdF protective layer was disposed on the lithium metal layer and an amount of the reduced graphene oxide-PVdF protective layer was 3.17 $mg/cm^2$ of the lithium metal layer.

Comparative Example 1

A coin half-cell was manufactured in the same manner as in Example 5, except that a negative electrode was manufactured using only a lithium metal layer

Comparative Example 2

A coin half-cell was manufactured in the same manner as in Example 5, except that 0.03 mL of the carbon black-PVdF solution was disposed on the lithium metal layer instead of 0.04 mL of the graphene oxide-PVdF solution prepared according to Example 3 to manufacture a negative electrode in which a carbon black-PVdF protective layer was formed on the lithium metal layer and an amount of the carbon black-PVdF protective layer was 3.2 $mg/cm^2$ of the lithium metal layer.

Lithium Battery Performance Evaluation

Evaluation Example 1

Evaluation of Voltage with Respect to Charging and Discharging Capacity of a Lithium Battery A profile of voltage with respect to the capacity of the coin half-cells manufactured according to Examples 5 and 6 and Comparative Examples 1 and 2 was measured in a voltage range of about −0.2 V to about 0.4 V versus lithium by performing up to a total of 10 cycles with a current of 0.177 milliamperes (mA) for 10 hours. The results are shown in FIGS. 3A to 3D.

Figure 3A:
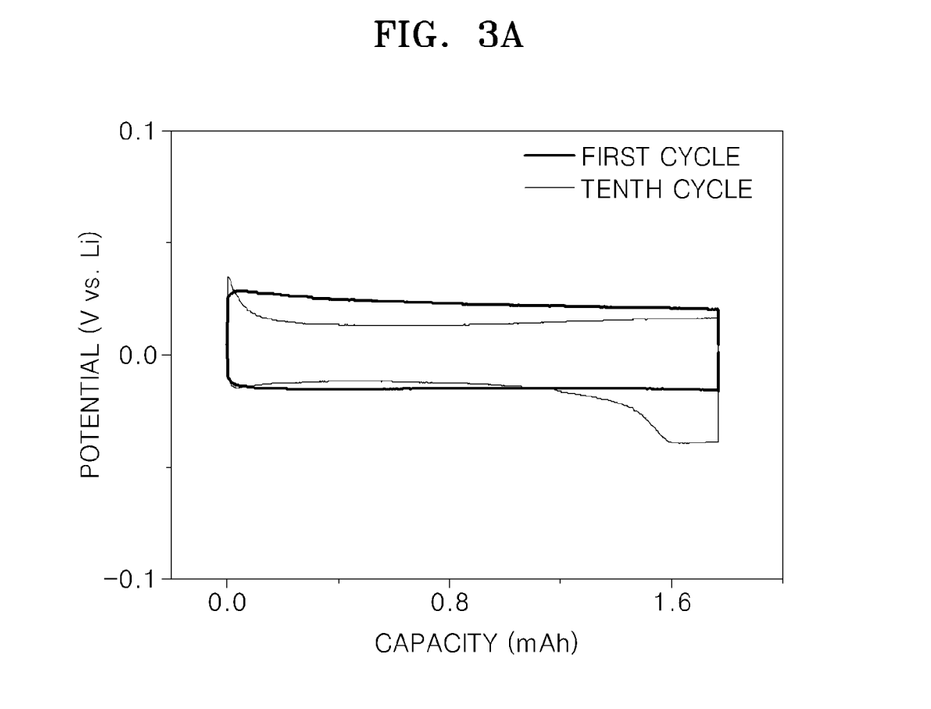
FIG. 3A is a graph of potential (volts versus lithium, V vs. Li) with respect to charging and discharging capacity (milliampere hours, mAh) of a lithium battery manufactured according to Example 5 on a first cycle and a tenth cycle.
Figure 3B:
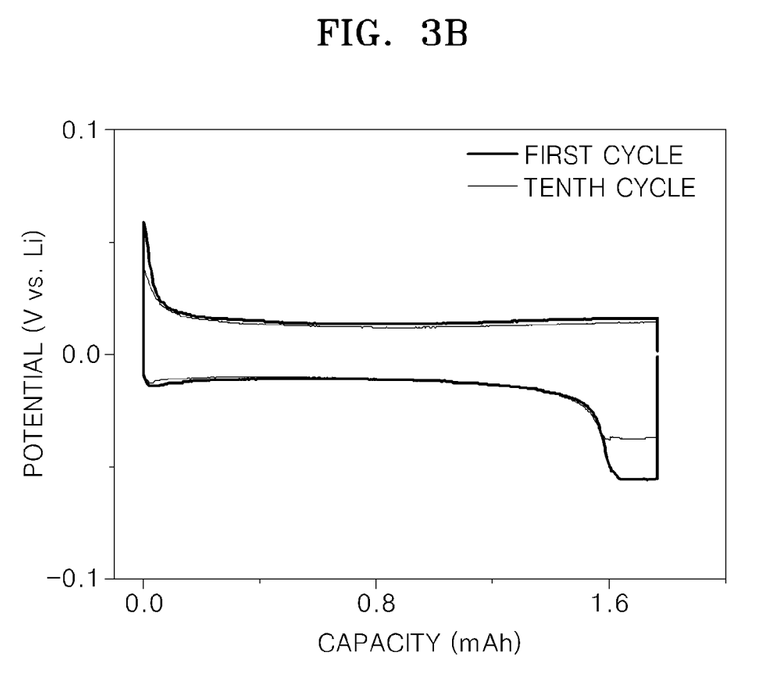
FIG. 3B is a graph of potential (V vs. Li) with respect to a charging and discharging capacity (mAh) of a lithium battery manufactured according to Example 6 on a first cycle and a tenth cycle.

Referring to FIGS. 3A and 3B, it was confirmed that in the case of Example 5, the first cycle reached a plateau at about 0.04 V, and the tenth cycle reached a plateau at about 0.13 V. It was also confirmed that in the case of Example 6, the first cycle reached a plateau at about 0.05 V, and the tenth cycle also reached a plateau at about 0.05 V.

Figure 3C:
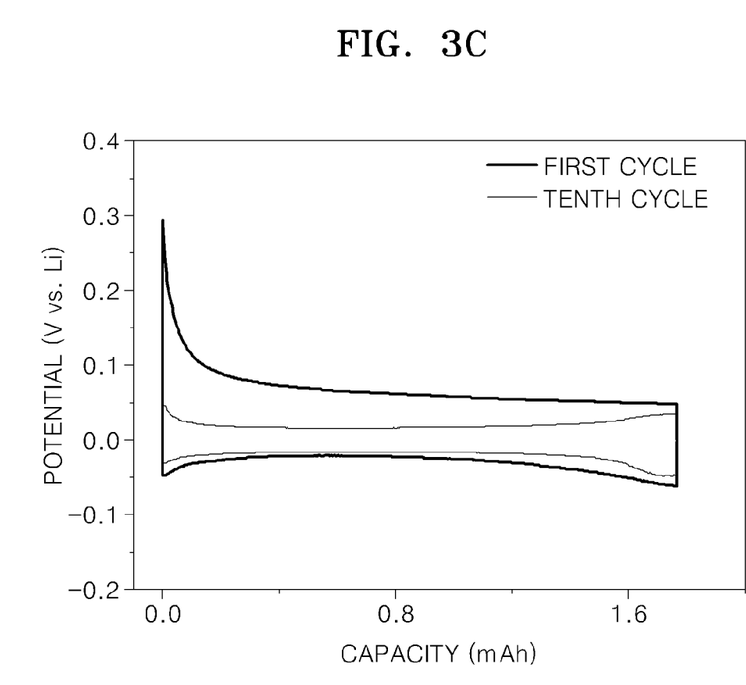
FIG. 3C is a graph of potential (V vs. Li) with respect to a charging and discharging capacity (mAh) of a lithium battery manufactured according to Comparative Example 1 on a first cycle and a tenth cycle.
Figure 3D:
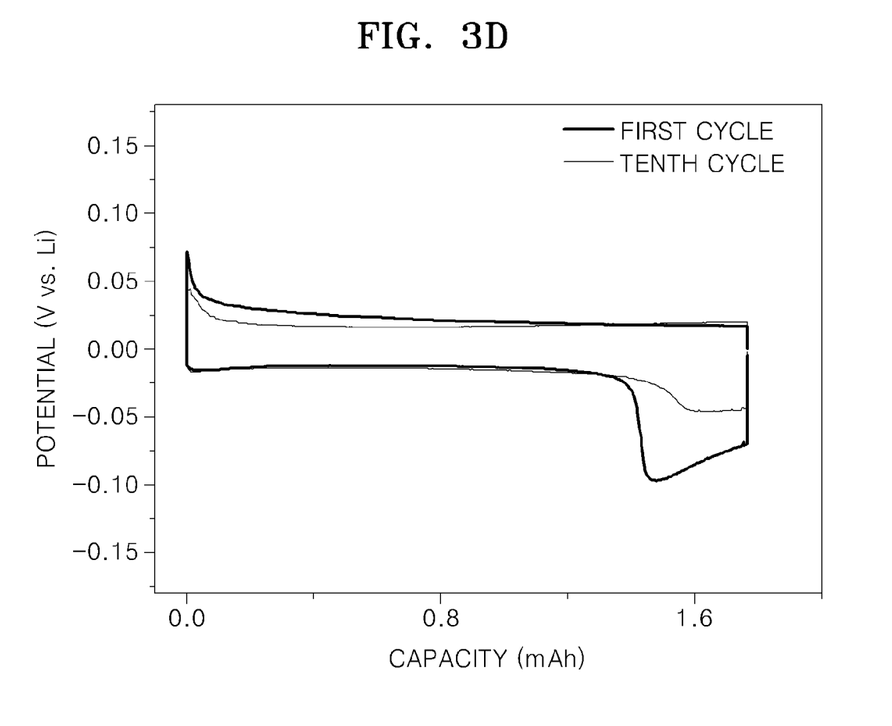
FIG. 3D is a graph of potential (V vs. Li) with respect to a charging and discharging capacity (mAh) of a lithium battery manufactured according to Comparative Example 2 on a first cycle and a tenth cycle.

However, referring to FIGS. 3C and 3D, it was confirmed that in the case of Comparative Example 1, the first cycle reached a plateau at about 0.3V, and like in Example 6, the tenth cycle reached a plateau at about 0.05V. It was also confirmed that in the case of Comparative Example 2, the first cycle reached a plateau at about 0.5 V, and the tenth cycle reached a plateau at about 0.2 V.

Accordingly, it was confirmed that the lithium batteries manufactured according to Examples 5 and 6 may prevent formation of dendrites on the surface of a lithium metal layer compared to those of Comparative Examples 1 and 2, thereby having excellent capabilities for reducing a volumetric change occurring during charging and discharging.

The disclosed negative electrode for a lithium battery may reduce a volumetric change of a carbonaceous material having a plate structure formed on a metal layer including lithium, and a lithium battery including the negative electrodes may have improved charging and discharging characteristics and thus have improved lifespan characteristics.

It should be understood that the exemplary embodiment described herein should be considered in a descriptive sense only and not for purposes of limitation. Descriptions of features, advantages, or aspects within each embodiment should be considered as available for other similar features, advantages or aspects in other embodiments.

What is claimed is:

1. A negative electrode for a lithium battery, the negative electrode comprising:
    a metal layer comprising lithium; and
    a carbonaceous material layer comprising a carbonaceous material having a plate structure and disposed on the metal layer,
    wherein the carbonaceous material layer is in the form of a flat film, and the film has a thickness of about 1 nanometer to about 100 nanometers, and comprises a polycyclic aromatic molecule comprising a plurality of covalently bonded carbon atoms, and
    wherein the carbonaceous material comprises at least one selected from graphene oxide, reduced graphene oxide, a nano-scale graphene platelet, and functionalized graphene.

2. The negative electrode of claim 1, wherein the carbonaceous material layer is in epitaxy with the metal layer.

3. The negative electrode of claim 1, wherein the carbonaceous material has a crystalline structure.

4. The negative electrode of claim 1, wherein the carbonaceous material layer comprises a single-layered structure of 1 to 300 layers of carbon.

5. The negative electrode of claim 1, wherein the carbonaceous material layer is an exfoliated layer or a grown layer.

6. The negative electrode of claim 1, wherein the carbonaceous material layer is an exfoliated single layer.

7. The negative electrode of claim 1, wherein the carbonaceous material layer comprises two or more layers grown on a substrate by chemical vapor deposition using a graphitization catalyst.

8. The negative electrode of claim 1, wherein the carbonaceous material layer has a specific surface area of about 25 square meters per gram to about 500 square meters per gram.

9. The negative electrode of claim 1, wherein the carbonaceous material layer further comprises an organic binder.

10. The negative electrode of claim 9, wherein an amount of the binder of the carbonaceous material layer is in a range of about 5 parts by weight to about 50 parts by weight, based on 100 parts by weight of a carbonaceous material of the carbonaceous material layer.

11. The negative electrode of claim 1, wherein the metal layer including lithium comprises at least one selected from lithium metal and a lithium-alloyable metal.

12. The negative electrode of claim 11, wherein the lithium-alloyable metal comprises at least one metal selected from Si, In, Pb, Ga, Ge, Sn, Al, Bi, and Sb.

13. A lithium battery comprising:
    a positive electrode;
    an electrolyte; and
    a negative electrode,
    wherein the negative electrode comprises a metal layer including lithium, and a carbonaceous material layer comprising a carbonaceous material having a plate structure and disposed on the metal layer,
    wherein the carbonaceous material layer is in the form of a flat film, the film has a thickness of about 1 nanometer to about 100 nanometers, and comprises a polycyclic aromatic molecule comprising a plurality of covalently bonded carbon atoms,
    wherein the carbonaceous material comprises at least one selected from graphene oxide, reduced graphene oxide, a nano-scale graphene platelet, and functionalized graphene, and
    wherein the metal layer is between the carbonaceous material layer and a support.

14. The lithium battery of claim 13, wherein the carbonaceous material layer is disposed on a surface of the negative electrode which faces a separator, which is disposed between the positive electrode and the negative electrode.

15. The lithium battery of claim 13, wherein the lithium battery is a secondary lithium battery.

* * * * *